United States Patent [19]
Kenyon

[11] 3,849,976
[45] Nov. 26, 1974

[54] HIGH MODULUS TIRE CORD
[75] Inventor: Derek Kenyon, Pontypool, England
[73] Assignee: Imperial Chemical Industries Limited, London, England
[22] Filed: Apr. 10, 1972
[21] Appl. No.: 242,459

Related U.S. Application Data
[60] Division of Ser. No. 859,522, July 22, 1969, abandoned, which is a continuation of Ser. No. 665,351, Sept. 5, 1967, abandoned.

[30] Foreign Application Priority Data
Sept. 13, 1966 Great Britain.................. 40816/66

[52] U.S. Cl................ 57/140 R, 57/157 S, 264/290
[51] Int. Cl............................................... D02g 3/48
[58] Field of Search.......... 57/140 R, 157 S, 157 R; 28/72 R, 71.1; 264/290

[56]  References Cited
UNITED STATES PATENTS

| 2,932,901 | 4/1960 | Salem et al. ............................ 34/23 |
| 3,343,363 | 9/1967 | Stow, Jr. et al................... 57/140 R |
| 3,395,200 | 7/1968 | Mader, Jr. et al. ................. 264/290 |
| 3,419,060 | 12/1968 | Goy............................... 57/140 R X |
| 3,469,001 | 9/1969 | Keefe, Jr............................. 264/290 |
| 3,545,911 | 12/1970 | Papero, Jr. et al............ 57/140 R X |
| 3,553,307 | 1/1971 | Kovac et al......................... 264/290 |

Primary Examiner—John Petrakes
Attorney, Agent, or Firm—Thomas J. Morgan; Robert J. Blanke

[57] ABSTRACT

Nylon cord for tire manufacture is made by hot-stretching the drawn cord under substantially unvarying tension while passing it through a heating zone maintained at between the melting point and twenty degrees below for a period up to about thirty seconds. The resulting cord has superior modulus and low heat contraction while retaining high tensile strength.

3 Claims, 1 Drawing Figure

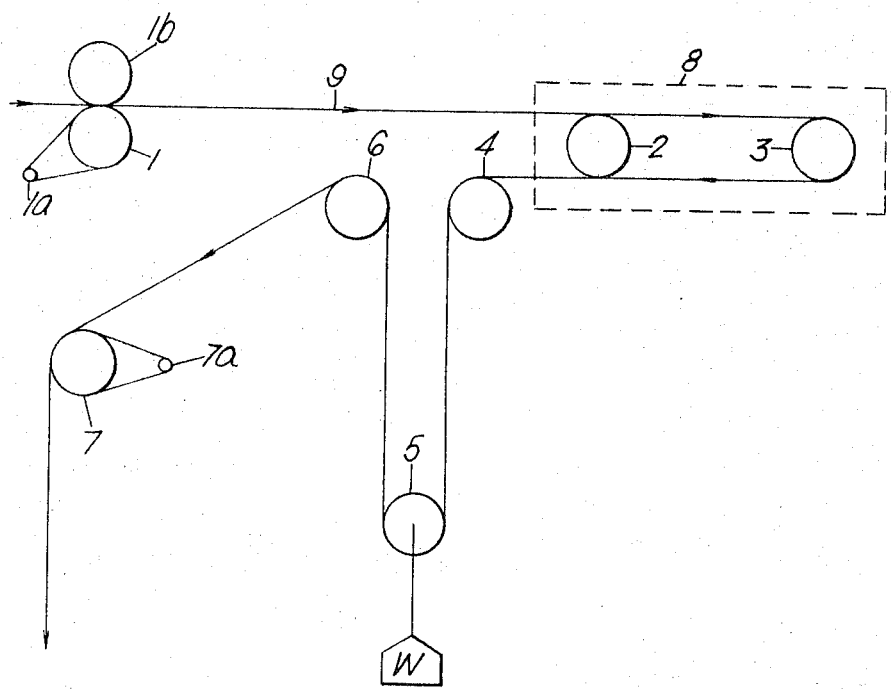

HIGH MODULUS TIRE CORD

This applicatin is a division of application Ser. No. 859,522, filed July 22, 1969, now abandoned, which is a continuation of application Ser. No. 665,351, filed Sept. 5, 1967, now abandoned.

The present invention relates to polyamide yarns and cords having improved properties and particularly, though not exclusively, to an improved tyre cord comprising nylon 66 filaments or yarns.

The use of nylon 66 (referred to hereinafter as nylon) as a reinforcing material for tyres is already well-known. The reasons why such reinforcement is necessary are largely two-fold and as follows.

Firstly, the heavy stresses imposed on a tyre during, for instance, cornering at high speed might lead to rupture of the elastomer constituting the bulk of the tyre, for instance vulcanized rubber, were this not reinforced by some other material having a much higher strength. The superior tensile strength of nylon makes it very desirable for use as such a tyre reinforcing material.

Secondly, while the elastic stretch properties of the elastomer are essential for the functioning of the tyre as a shock-buffer, excessive stretching is undesirable since the tyre must retain sufficient permanent dimensional stability while under the high stresses imposed on it during use. Furthermore, repeated excessive stretching and compression of the elastomer can lead to its rapid breakdown.

In order to prevent such excessive stretching of the elastomer, a reinforcing fabric or web is incorporated in the tyre during its manufacture. This web is made from tyre cords and these cords should have a sufficiently high elastic modulus to prevent excessive stretching under the loads applied to the tyre during use. The above mentioned modulus is a measure of resistance to stretching and is usually expressed as the stress, in grams per denier, required to stretch the cord by a given amount. The method of measuring the modulus will be described hereinafter.

When using conventional nylon cord as a tyre-reinforcing material, because of the rather low modulus of such cords it is common practice to use more cord in the tyre than is necessary for obtaining the required tyre strength. The production of a nylon tyre cord which has the high tensile strength of nylon combined with a higher than normal modulus is, therefore, very desirable. Clearly, the higher the modulus of the cord the less the amount of cord required to produce the necessary dimensional stability of the tyre, within certain reasonable limits.

When considerably less high modulus cord is used the tensile strength of the cord may have to be increased, in order to retain the necessary tyre strength. Thus, the production of a nylon tyre cord with higher than normal modulus combined with higher than normal tensile strength is of great advantage, particularly if other important properties of the cord are preserved. Such a property, and a very important one, is heat contraction. It is necessary that the reinforcing cord shrink as little as possible during manufacture of the tyre, a process involving heating, and during subsequent use of the tyre, during which considerable heat may be produced.

It is, therefore, one of the objects of the present invention to produce polyamide tyre cords and similar polyamide yarns and cords having an improved resistance to stretching, expressed in terms of the modulus, combined with improved tensile strength and an acceptably low heat shrinkage.

The methods of measurement of these three parameters; modulus, tensile strength and heat shrinkage, will be described hereinafter.

Accordingly, the present invention in one of its aspects provides a process for the production of improved polyamide yarns or cords wherein yarn is passed through a constant temperature heating zone in such manner that it acquires and maintains a constant temperature, in the region between the melting point of said yarn and 20°C below it, for a period of time not exceeding 30 seconds and is maintained under a substantially unvarying tension by tensioning means which automatically compensates for variations in length of yarn in the heating zone.

In another of its aspects the present invention provides a polyamide yarn or cord having an $L_5$ modulus above 60, a tensile strength T above 8 and a heat contraction $H_c$ below 4 percent, the parameters $L_5$, T and $H_c$ being measured as described herein.

The usual process for the commercial preparation of nylon tyre cord is in essence as follows. Nylon yarn is first drawn on a drawtwisting machine to as high a degree as possible without producing so many filament breaks that the strength of the yarn is reduced and without producing so many whole yarn breaks that the drawing process is uneconomical to run. In this way a yarn is obtained having a high tensile strength, equivalent to around 9 gms. per denier, and a residual extensibility to break of around 15 percent. Two or more strands of this fully-drawn yarn are then twisted together to make a cord and such cords, after further treatment as described below, are used for making the reinforcing fabrics or webs incorporated in the tyre.

Twisting the strands together gives the cord so produced a weak springiness, that is a tendency to stretch under light loads and this is undesirable, as described above. This twist-springiness is usually reduced by a hot-stretching process which comprises heating the cord in the stretched condition. This process sets the yarn, so that when the stretching force is removed the cord configuration does not spring back to its original, twist-springy, state.

In practice this hot-stretching process is carried out in conditions which not only set the cord, so as to remove the twist-springiness, but which also produce other desirable results such as low shrinkage when the yarn is later heated during the making of the tyre or during tyre use.

Numerous patent specifications have appeared describing hot-stretching processes for producing tyre cords having various desirable properties. Mention may be made, for instance, of British Pat. No. 1,014,280 and U.S. Pat. No. 2,509,741. The modulus, a most important parameter, as described above, is not always mentioned and when figures are quoted in specifications dealing with polyamide cords they are equivalent to moduli which are considerably lower than those possessed by the cords of the present invention.

Applicants have now found a process for producing a polyamide yarn, for example a tyre cord, having superior modulus combined with high tensile strength and low heat contraction.

The above mentioned parameters: modulus, tensile strength and heat contraction, called hereinafter $L_5$, T and $H_c$ respectively, are measured on the treated cord as follows.

Modulus, $L_5$. The tyre cord is stretched on a Scott Inclined Plane testing machine with a constant rate of loading such that the sample breaks in approximately 11 seconds (1.82 lbs. per sec. for a two-fold 840/140 denier tyre cord), at 65±2 percent relative humidity and 20±2°C. The load versus stretch graph is automatically recorded and the load required to stretch the cord by 5 percent of its original length is read from this graph. This figure, expressed in grams, is then multiplied by 20 and divided by the cord denier to obtain the $L_5$ value.

Tensile strength T. The graph obtained as described for modulus $L_5$ is used. The load, expressed in grams, at the point where the yarn breaks is divided by the cord denier to obtain the value of T.

Heat Contraction $H_c$ 100 cms. of cord are wound to form a hank and held at 150°C. in an oven for half-an-hour. The bank is then removed, conditioned in air at 65±2 percent relative humidity and 20±2°C. for 24 hours and the cord length re-measured. The contraction $H_c$ is expressed as a percentage of the original length.

The most convenient process known to us by which an improved tyre cord according to the present invention may be produced will now be described, with reference to the drawing which is a diagrammatic representation of the relevant parts of the apparatus employed.

Two or more strands of fully drawn nylon yarn are twisted together in the known manner to produce a tyre cord which is then treated, if required, with a dip solution to promote good adhesion to the elastomer and dried. This dipping and drying operation can be carried out continuously on the same machine that is used for the hot stretching process.

The said cord 9 is first passed several times around roll 1 and separator roll 1a, to obtain full grip between cord and roll. This grip is enhanced by the idler roll 1b. The cord then passes backwards and forwards round rolls 2 and 3, several times. It is an important part of the process that these rolls 2 and 3 should be located inside the heating zone 8 and should be allowed to reach the temperature of the heating zone before processing begins. In this way the cord is preserved at the required temperature without intermittent cooling. The heating zone is heated by blowing hot air into it and the internal temperature is measured at several points using thermocouples.

The cord then leaves the heating zone 8, passes over rolls 4, 5 and 6 and is then wound several times around rolls 7 and 7a, to obtain full grip. Roll 5 is virtually free to move vertically up and down and is pulled vertically downwards by an attached weight W. The speed of roll 7 is controlled electronically from the up and down movement of roll 5 in such a manner as to preserve the cord under constant tension. This tension is approximately half the weight W.

Thus, an essential factor in this process is that during the passage of the cord through the heating zone it is held under substantially constant unvarying tension and is substantially free to undergo dimensional changes.

This process differs from that usually employed in the trade, where the cord, or in some cases a fabric made from the cord, is stretched by a given amount when passing through the heating zone and is virtually free to undergo tension changes. The required stretch is usually applied by passing the material over rolls having different peripheral speeds and is usually in the region of 7–15 percent. We have found that using this constant stretch method the cord cannot be hot-stretched to the degree required, an average of about 25–30 percent, in order to obtain the superior results of the present invention without the cord or its constituent filaments breaking excessively.

The tension applied to the cord, the temperature of the heating zone and the time for passage through the heating zone are all important parameters. The cord must not stay at a high temperature long enough for substantial thermal degradation to take place but must of course stay at the temperature long enough for the required thermal effect to take place. We have found that cord with the required properties can be obtained using the method described with passage times of as low as 10 seconds and perhaps lower times may be used with more efficient heating.

The following is a practical example of the production of an improved tyre cord of the present invention using the apparatus hereinbefore described. It is for illustration only and in no way limits the scope of the invention.

EXAMPLE

Nylon 66 yarn made from polymer containing an antioxidant was fully drawn to produce 840/140 denier yarn with the properties shown in Table 1 below. Two strands of this yarn were then twisted together to produce a cord with the properties shown in Table 2. This cord was then subjected to the treatment hereinbefore described for the production of the improved tyre cord. The length of cord in the heating zone was approximately 12 yards and it was fed into the zone from roll 1 at 24 yards per minute.

The said treatment was carried out using various heating zone temperatures and various tensions and the resulting cord properties, measured as hereinbefore described, are shown in Table 3.

TABLE 1

Drawn Yarn Properties

| Denier | Tensile Strength T | Extensibility | Modulus $L_5$ |
|---|---|---|---|
| 840 | 9.0 g/d | 15.1% | 38.8 g/d 100% |

TABLE 2

Properties of Untreated Cord

| Denier | Tensile Strength T | Extensibility | Modulus $L_5$ | Heat Contraction $H_c$ | Twist |
|---|---|---|---|---|---|
| 1915 | 7.3 g/d | 22.5% | 21.8 | 6.6(%) | 12 Turns/inch (Singles Z twist) (cord S twist) |

TABLE 3

Treated Cord results.

| Treatment Conditions | | | | | | | |
|---|---|---|---|---|---|---|---|
| Heating-zone temp. (°C) | Tension (lb) | Passage time in heating zone (sec) | Denier | Tensile Strength T (g/d) | Extension % | Modulus $L_5$ (g/d 100%) | Heat Contraction $H_c$(%) |
| 180 | 5 | 30 | 1953 | 7.0 | 16.8 | 28.1 | 5.5 |
|  | 7 |  | 1948 | 6.9 | 15.9 | 29.8 | 6.0 |
|  | 9 |  | 1928 | 7.2 | 15.7 | 30.2 | 6.1 |
|  | 10 |  | 1908 | 7.4 | 15.6 | 31.9 | 6.2 |
|  | 11 |  | 1891 | 7.2 | 13.4 | 32.6 | 6.3 |
|  | 12 |  | 1853 | 7.2 | 13.2 | 34.7 | 6.5 |
|  | 13 |  | 1833 | 7.5 | 13.1 | 35.6 | 6.6 |
| 220 | 5 | 30 | 1900 | 7.1 | 16.6 | 32.2 | 3.6 |
|  | 7 |  | 1896 | 7.1 | 15.6 | 32.5 | 4.1 |
|  | 9 |  | 1826 | 7.4 | 14.0 | 33.9 | 4.2 |
|  | 10 |  | 1673 | 7.9 | 12.1 | 37.0 | 4.2 |
|  | 11 |  | 1626 | 7.7 | 11.1 | 38.3 | 4.4 |
|  | 12 |  | 1552 | 7.5 | 10.3 | 41.7 | 4.5 |
| 240 | 5 | 30 | 1741 | 8.7 | 16.0 | 45.9 | 2.8 |
|  | 7 |  | 1679 | 8.7 | 14.6 | 53.0 | 3.0 |
|  | 9 |  | 1653 | 8.9 | 13.3 | 54.9 | 3.5 |
|  | 10 |  | 1452 | 9.2 | 10.3 | 68.9 | 3.7 |
|  | 11 |  | 1447 | 9.2 | 10.0 | 67.9 | 3.7 |
| 245 | 8 | 30 | 1549 | 8.7 | 11.2 | 65.9 | 3.4 |
|  | 9 |  | 1454 | 9.1 | 9.8 | 70.0 | 3.5 |
|  | 10 |  | 1389 | 8.9 | 8.8 | 75.9 | 3.5 |

It can be seen from the results that with a heating zone temperature of 240°C and with tensions of around 10 lbs. tyre cord with high modulus, high tensile strength and low heat contraction was produced.

With a temperature of 245°C and a tension around 9 lbs. cord with even higher modulus was obtained, which still had high tensile strength and low heat contraction.

In both cases the tensile strength was as good as that of the original drawn yarn.

It can be seen from Table 3 that, in order to attain the high moduli of the present invention, heating zone temperatures as near the melting point (about 250°C for nylon 66) of the yarn as possible, consistent with satisfactory process operation, are desirable. In the same way, as high tension as possible is desirable so long as it does not bring about excessive breakage of yarn filaments.

A heating zone temperature between the melting point of the yarn and 20°C below it in conjunction with a tension of above 1 lb. per 100 denier is desirable. The optimum temperature and tension are, of course, easily found by simple experimentation.

It will readily be appreciated by those skilled in the art that while the above data refer specifically to nylon 66, improved yarns or cords may be obtained from other polyamides using suitable constant tensions and temperatures and suitable passage times in the process as hereinbefore described. It will of course also be appreciated that the invention is in no way limited to the treatment of cords made by twisting together two or more separate strands of nylon multifilament yarn since a single strand of yarn of appropriate denier could also be treated. As is well known, lowering the amount of twist in the cord prior to heat-treatment increases the modulus of the final, heat-treated, cord and, in some cases, twist levels below the 12 turns per inch exemplified may be needed to attain the requisite properties. Such an adjustment of twist level can, of course, be easily performed by one skilled in the art.

What we claim is:

1. A polyamide yarn or cord having an $L_5$ modulus above 60 a tensile strength T above 8 and a heat contraction $H_c$ below 4 percent, the parameters $L_5$, T, and $H_c$ being measured as described herein.

2. The product of claim 1 wherein said polyamide is nylon 66.

3. The product of claim 1 wherein said yarn or cord comprises two or more strands twisted together.

* * * * *